United States Patent
Dohta et al.

(10) Patent No.: US 11,620,801 B2
(45) Date of Patent: Apr. 4, 2023

(54) INFORMATION-PROCESSING DEVICE, STORAGE MEDIUM, INFORMATION-PROCESSING SYSTEM, AND INFORMATION-PROCESSING METHOD

(71) Applicant: NINTENDO CO., LTD., Kyoto (JP)

(72) Inventors: Takuhiro Dohta, Kyoto (JP); Ryuji Kobayashi, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 508 days.

(21) Appl. No.: 16/930,571

(22) Filed: Jul. 16, 2020

(65) Prior Publication Data
US 2021/0038984 A1 Feb. 11, 2021

(30) Foreign Application Priority Data

Aug. 9, 2019 (JP) .............................. JP2019-147332

(51) Int. Cl.
| | | |
|---|---|---|
| G06T 19/20 | (2011.01) | |
| G06T 15/20 | (2011.01) | |
| G06T 15/00 | (2011.01) | |
| A63F 13/525 | (2014.01) | |

(52) U.S. Cl.
CPC ............ *G06T 19/20* (2013.01); *A63F 13/525* (2014.09); *G06T 15/005* (2013.01); *G06T 15/20* (2013.01); *G06T 2210/16* (2013.01); *G06T 2219/2021* (2013.01)

(58) Field of Classification Search
None
See application file for complete search history.

(56) References Cited

U.S. PATENT DOCUMENTS

| | | | |
|---|---|---|---|
| 2007/0273711 A1* | 11/2007 | Maffei | G06T 17/20 |
| | | | 345/639 |
| 2013/0307850 A1 | 11/2013 | Mukai | |
| 2016/0035142 A1* | 2/2016 | Nair | A63F 13/53 |
| | | | 345/420 |

FOREIGN PATENT DOCUMENTS

JP 2012-208536 10/2012

OTHER PUBLICATIONS

Frédéric Cordier, Pascal Volino, Nadia Magnenat-Thalmann, "Integrating deformations between bodies and clothes", Feb. 2001, Wiley, The Journal of Visualization and Computer Animation, vol. 12, Issue 1: 3D Modeling and Animation of Clothes, pp. 1-53.*
R. Galvao, R. G. Laycock, A. M. Day, "GPU Techniques for Creating Visually Diverse Crowds in Real-Time", Oct. 29, 2008, ACM, VRST '08: Proceedings of the 2008 ACM symposium on Virtual reality software and technology, pp. 79-86.*

(Continued)

*Primary Examiner* — Robert Bader
(74) *Attorney, Agent, or Firm* — Nixon & Vanderhye PC

(57) ABSTRACT

An information-processing device selects a worn-item object to be worn by a character object within a virtual space, controls the character object within the virtual space, deforms at least one part of the character object by a degree according to a first parameter that is associated with the selected worn-item object, the at least one part being associated with the first parameter, and generates, by use of a virtual camera, an image of the virtual space that includes the character object wearing the selected worn-item object.

17 Claims, 12 Drawing Sheets

(56) References Cited

OTHER PUBLICATIONS

Marius Preda, Francoise Preteux, "Insights into low-level avatar animation and MPEG-4 standardization", Oct. 2002, Elsevier, Signal Processing: Image Communication, vol. 17, issue 9, pp. 717-741.*

[Online], "Produce Individuality Arrange your home and fashion as you like," <URL: https://www.nintendo.co.jp/3ds/egdj/life/lifebox3.html> w/ English Translation, printed Jul. 9, 2020, 9 pages.

* cited by examiner

| VER-TEX | COORDI-NATE | NORMAL VECTOR | COLOR | UV COORDINATE | JOINT | |
|---|---|---|---|---|---|---|
| | | | | | JOINT NUMBER | WEIGHT VALUE |
| P1 | (X1,Y1,Z1) | V1 | (R1,G1,B1,A1) | C1 | J1 | W1 |
| P2 | (X2,Y2,Z2) | V2 | (R2,G2,B2,A2) | C2 | J2 | W2 |
| ... | ... | ... | ... | ... | ... | ... |

FIG. 8

| JOINT NUMBER | COORDINATE | LINK |
|---|---|---|
| J10 | (X10,Y10,Z10) | J15 |
| J11 | (X11,Y11,Z11) | J16 |
| ⋮ | ⋮ | ⋮ |

FIG. 9

| VERTEX | COORDINATE | NORMAL VECTOR | COLOR | UV COORDI-NATE | JOINT ||
|---|---|---|---|---|---|---|
| | | | | | JOINT NUMBER | WEIGHT VALUE |
| P20 | (X20,Y20,Z20) | V20 | (R20,G20,B20,A20) | C20 | J20 | W20 |
| P21 | (X21,Y21,Z21) | V21 | (R21,G22,B22,A22) | C21 | J21 | W21 |
| ... | ... | ... | ... | ... | ... | ... |

FIG. 10

| VERTEX | COORDINATE | NORMAL VECTOR | COLOR | UV COORDINATE |
|---|---|---|---|---|
| P30 | (X30,Y30,Z30) | V30 | (R30,G30,B30,A30) | C30 |
| P31 | (X31,Y31,Z31) | V31 | (R31,G22,B22,A22) | C31 |
| ... | ... | ... | ... | ... |

FIG. 11

| CHARACTER | CL1 (SLEEVELESS) | | | | | CL2 (SHORT-SLEEVE) | | | | | CL3 (LONG-SLEEVE) | | | | | CL4 (BOTTOMS) | | | | |
|---|---|---|---|---|---|---|---|---|---|---|---|---|---|---|---|---|---|---|---|---|
| | R | G | B | A | MAX REDUCTION AMOUNT | R | G | B | A | MAX REDUCTION AMOUNT | R | G | B | A | MAX REDUCTION AMOUNT | R | G | B | A | MAX REDUCTION AMOUNT |
| CH1 | 0.6 | 0 | 0 | 0 | 0.35 | 0.6 | 0.6 | 0 | 0 | 0.35 | 0.6 | 0.6 | 0.6 | 0 | 0.35 | 0 | 0 | 0 | 0.6 | 0.35 |
| CH2 | 0.6 | 0 | 0 | 0 | 0.35 | 0.6 | 0.6 | 0 | 0 | 0.35 | 0.6 | 0.6 | 0.6 | 0 | 0.35 | 0 | 0 | 0 | 0.6 | 0.35 |
| ⋮ | ⋮ | | | | | ⋮ | | | | | ⋮ | | | | | ⋮ | | | | |

INFORMATION-PROCESSING DEVICE, STORAGE MEDIUM, INFORMATION-PROCESSING SYSTEM, AND INFORMATION-PROCESSING METHOD

CROSS REFERENCE TO RELATED APPLICATIONS

The disclosure of Japanese Patent Application No. 2019-147332, filed on Aug. 9, 2019, is incorporated herein by reference.

FIELD

An embodiment of the present invention relates to an image-processing technique.

BACKGROUND AND SUMMARY

There are known in the art games that allow for change of a character's clothes.

An information-processing device according to an embodiment of the present invention comprises: at least one processor; and at least one storage medium, wherein: the at least one storage medium is configured to store at least: data on a character object; data on worn-item objects to be worn by the character object; and first parameters, each of which is associated with at least a part of the character object and with a type of one of the worn-item objects, and the at least one processor is configured to: select within a virtual space one of the worn-item objects, to be worn by the character object; control the character object within the virtual space; deform a part of the character object by a degree according to one of the first parameters associated with the selected one of the worn-item objects, the part of the character object being associated with the one of the first parameters; and generate, by use of a virtual camera, an image of the virtual space that includes the character object wearing the selected one of the worn-item objects.

BRIEF DESCRIPTION OF THE DRAWINGS

FIG. 8 is a diagram showing an example of polygon model data of a character object.

FIG. 9 is a diagram showing an example of skeleton model data of a character object.

FIG. 10 is a diagram showing an example of polygon model data of a clothes object.

FIG. 11 is a diagram showing an example of polygon model data of a background object.

DETAILED DESCRIPTION OF NON-LIMITING EXAMPLE EMBODIMENTS

1. Embodiment

1-1. Configuration

Figure 1:
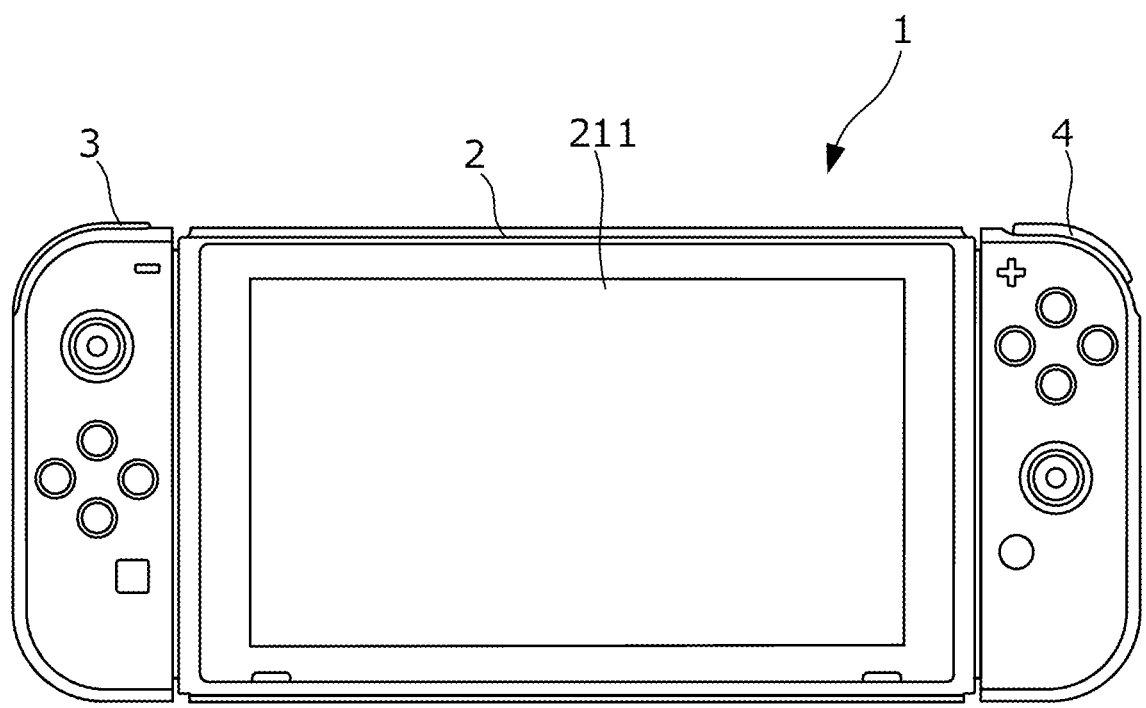
FIG. 1 is a diagram showing an example of an appearance of game system 1.

Game system 1 according to an embodiment of the present invention will now be described. FIG. 1 is a diagram showing an example of an appearance of game system 1. As shown in the figure, game system 1 includes main device 2, left controller 3, and right controller 4. Left controller 3 and right controller 4, which, hereafter, may be collectively referred to as "controller," can be attached to and detached from main device 2. Game system 1 can be used either in a state in which left controller 3 and right controller 4 are attached to main device 2 or in a state in which left controller 3 and right controller 4 are detached from main device 2.

Figure 2:
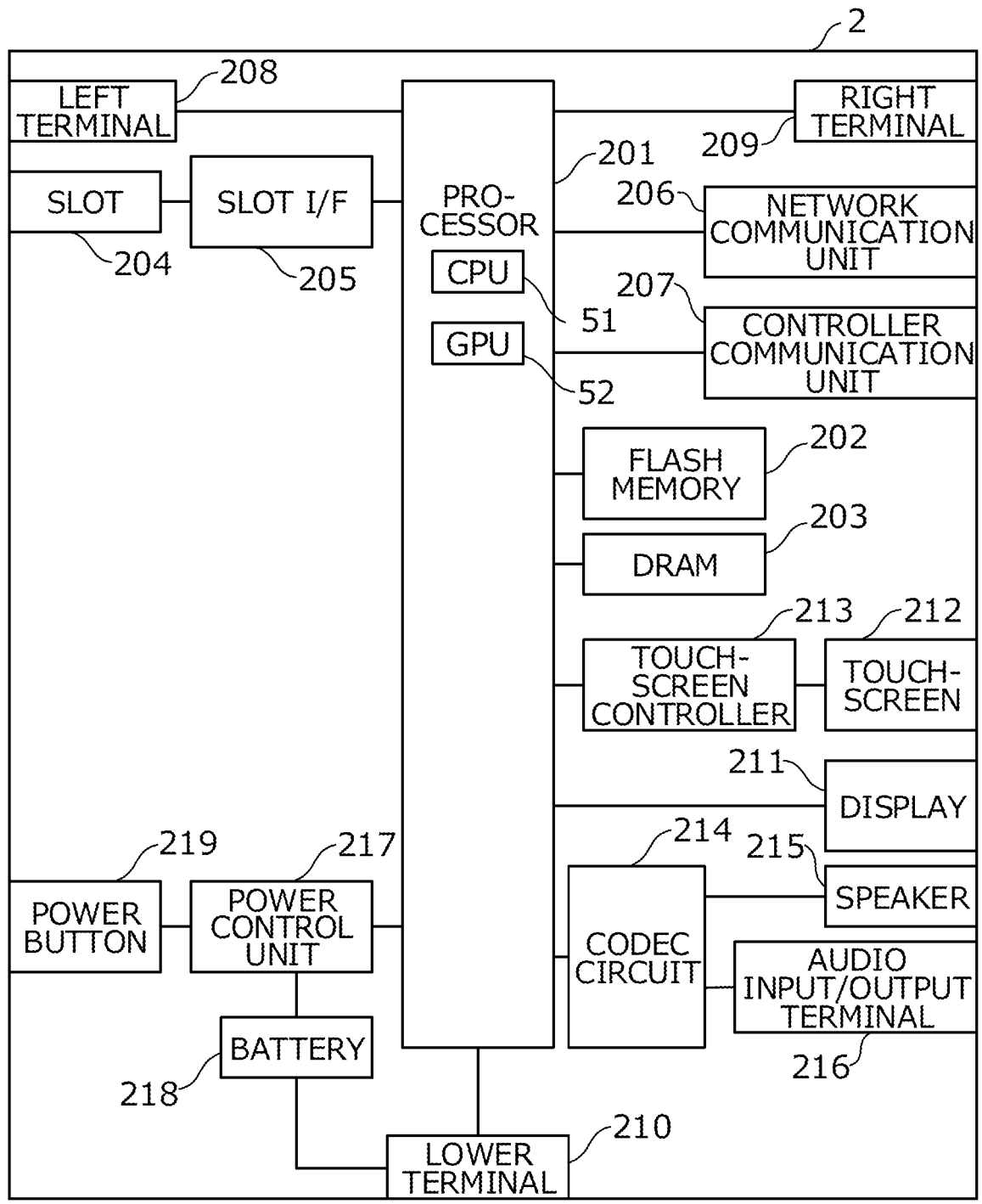
FIG. 2 is a block diagram showing an example of an internal configuration of main deice 2.

FIG. 2 is a block diagram showing an example of an internal configuration of main device 2. As shown in the figure, main device 2 includes processor 201, which is an information-processing unit for carrying out various types of information processing. Processor 201 includes CPU 51 and GPU 52. Processor 201 executes a program stored in an internal storage medium or an external storage medium for insertion into slot 204, to thereby carry out various types of information processing.

As examples of an internal storage medium, main device 2 includes flash memory 202 and DRAM 203. Flash memory 202 is a non-volatile memory for storing various types of data, and DRAM 203 is a volatile memory for temporarily storing various types of data.

Main device 2 also includes slot 204 and a slot interface (hereafter, abbreviated as "I/F") 205. Slot 204 is provided on an upper side of the housing of main device 2 and is shaped to allow insertion of an external storage medium such as a memory card. Slot I/F 205 may read and write data to an external storage medium inserted into slot 204 in accordance with instructions from processor 201.

Main device 2 also includes network communication unit 206, which is capable of wireless communication with an external device by use of a wireless LAN or infrared.

Main device 2 also includes controller communication unit 207, which is capable of wireless communication with left controller 3 and right controller 4 by use of near-field communication technology such as Bluetooth (registered trademark).

Main device 2 also includes left side terminal 208, right side terminal 209, and lower side terminal 210. Left side terminal 208 is a terminal that enables main device 2 to carry out wired communication with left controller 3. Right terminal 209 is a terminal that enables main device 2 to carry out wired communication with right controller 4. Lower terminal 210 is a terminal that enables main device 2 to communicate with a cradle. When connected to the cradle, main device 2 is able to output images and sounds to an external stationary monitor via the cradle.

Main device 2 also includes display 211, which is a display device such as a liquid crystal display or an organic EL display.

Main device 2 also includes touch-screen 212 and touch-screen controller 213. Touch-screen 212 is, for example, a capacitive touch screen, which is layered on top of display 211; and touch-screen controller 213 is a circuit for controlling touch-screen 212. Based on a signal output from touch-screen 212, touch-screen controller 213 generates data indicative of a position touched on touch screen 212, and outputs the generated data to processor 201.

Main device 2 also includes codec circuit 214, speaker 215, and audio input/output terminal 216. Codec circuit 214 is a circuit for controlling input and output of audio data to speaker 215 and audio input/output terminal 216.

Main device 2 also includes power control unit 217, battery 218, and power button 219. Power control unit 217 controls supply of power from battery 218 to components of main device 2 under control of processor 201.

Figure 3:
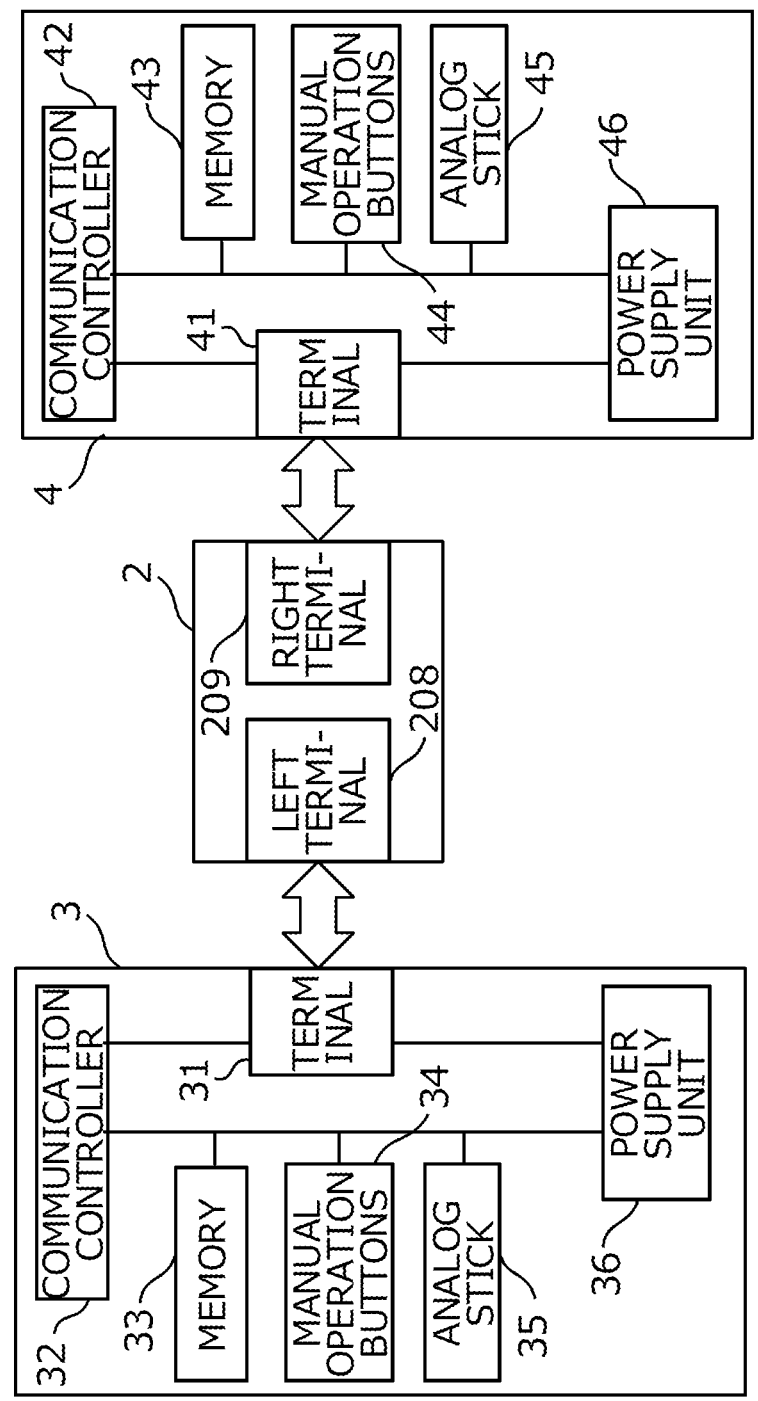
FIG. 3 is a block diagram showing an example of an internal configuration of left controller 3 and right controller 4.

FIG. 3 is a block diagram showing an example of an internal configuration of left controller 3 and right controller 4. As shown in the figure, left controller 3 includes terminal 31 for enabling left controller 3 to perform wired communication with main device 2.

Left controller 3 includes communication controller 32, which includes a microprocessor for control of communication with main device 2. Communication controller 32 is capable of both wired communication via terminal 31 and wireless communication not via terminal 31 with main device 2. When left controller 3 is attached to main device 2, communication controller 32 performs wired communication with main device 2 via terminal 31; whereas when left controller 3 is not attached to main device 2, communication controller 32 performs wireless communication with main device 2.

Left controller 3 also includes memory 33 such as a flash memory. Communication controller 32 executes firmware stored in memory 33 to carry out various types of processing.

Left controller 3 also includes various manual operation buttons 34 and analog stick 35, each of which may be used to output manual operation data to communication controller 32. Communication controller 32 sends obtained manual operation data to main device 2.

Left Controller 3 also includes power supply unit 36, which includes a battery and a power control circuit.

Right controller 4 includes terminal 41 for enabling right controller 4 to perform wired communication with main device 2.

Right controller 4 includes communication controller 42, which includes a microprocessor for control of communication with main device 2. Communication controller 42 is capable of both wired communication via terminal 41 and wireless communication not via terminal 41 with main device 2. When right controller 4 is attached to main device 2, communication controller 42 performs wired communication with main device 2 via terminal 41; whereas when right controller 4 is not attached to main device 2, communication controller 42 performs wireless communication with main device 2.

Right controller 4 also includes memory 43 such as a flash memory. Communication controller 42 executes firmware stored in memory 43 to carry out various types of processing.

Right controller 4 also includes various manual operation buttons 44 and analog stick 45, each of which may be used to output manual operation data to communication controller 42. Communication controller 42 may send obtained manual operation data to main device 2.

Right controller 4 also includes power supply unit 46, which includes a battery and a power control circuit.

An outline of a game executed by game system 1 will now be described.

Figure 4:
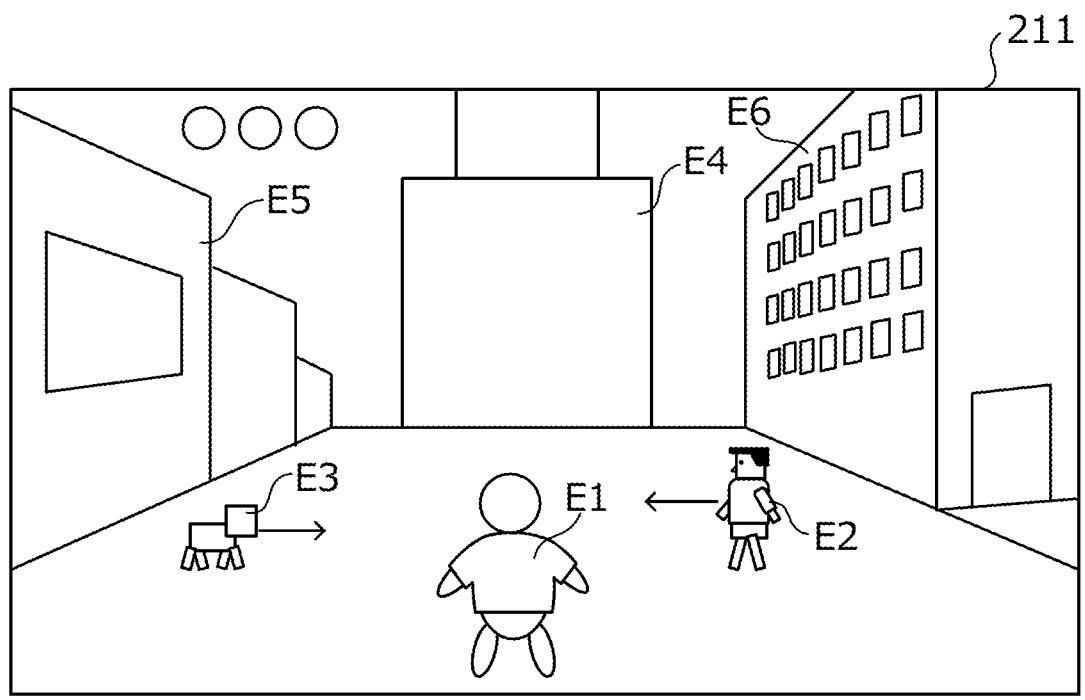
FIG. 4 is a diagram showing an example of a gameplay screen.

Game system 1 executes a game in which a player operates a character within a 3D virtual space. FIG. 4 is a diagram showing an example of a screen of the game. In the game, a 3D virtual space as shown in the figure is defined. Within the 3D virtual space, a virtual camera is disposed for capture of images to be shown on display 211. Within the 3D virtual space, display objects are arranged such as player character E1 operated by a player, non-player characters E2 and E3 controlled by processor 201, tower object E4, and building objects E5 and E6. Among these objects, player character E1 wears clothes that can be changed during game play. At least one non-player character may also wear clothes that can be changed.

Figure 5:
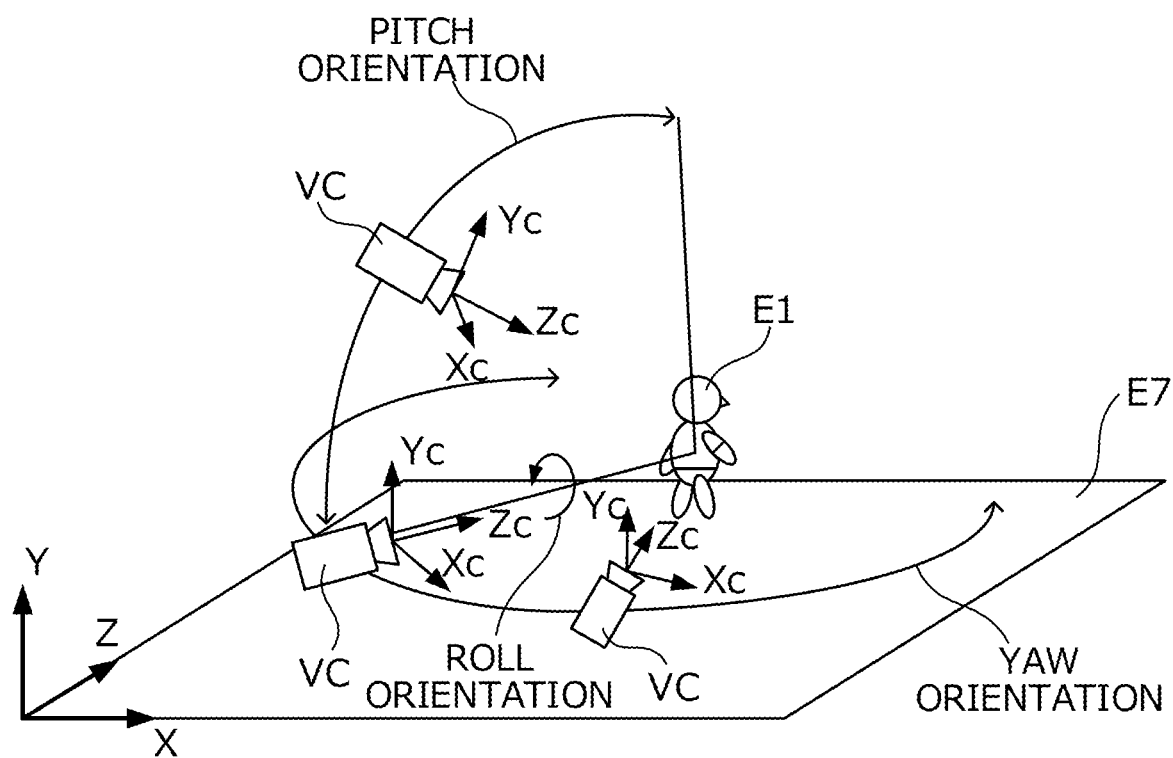
FIG. 5 is a diagram illustrating control of a position and an attitude of a virtual camera.

Within the 3D virtual space, the virtual camera is controlled by a player. FIG. 5 is a diagram illustrating control of a position and an attitude of the virtual camera. As shown in the figure, within the virtual space, a fixed xyz Cartesian coordinate system (hereafter, referred to as "world coordinate system") is defined. The y-axis is an axis extending in an upward direction within the virtual space, the x-axis is an axis perpendicular to the y-axis, and the z-axis is an axis perpendicular to the y-axis and the x-axis. On the x-z plane, ground surface object E7 is disposed, on which display objects such as player character E1 are disposed.

Within the virtual space, virtual camera VC is disposed. For virtual camera VC, a fixed XcYcZc Cartesian coordinate system (hereafter, referred to as "camera coordinate system") is defined. The Xc-axis is an axis extending in a rightward direction of virtual camera VC, the Yc-axis is an axis extending in the upward direction of virtual camera VC, and the Zc-axis is an axis extending along the line of sight of virtual camera VC. Virtual camera VC may be rotated around the Zc-axis (in a roll orientation), the Yc-axis (in a pitch orientation), or the Xc-axis (in a yaw orientation) in accordance with a user's operation. A zoom setting for virtual camera VC may also be changed in accordance with a user's operation.

Within the virtual space, a character object wearing a clothes object is subjected to deformation processing, which prevents the clothes object from merging into the character object when the character object performs an action.

Figure 6:
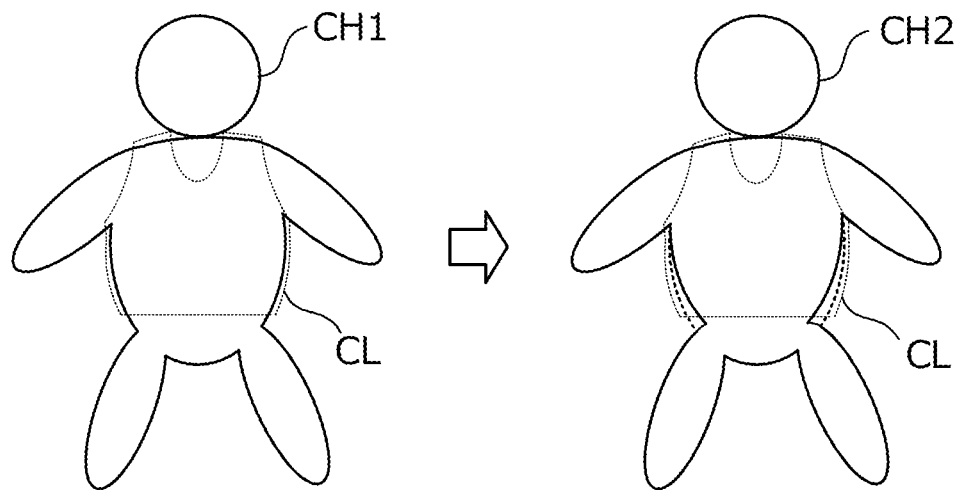
FIG. 6 is a diagram showing an example of a character object, a part of which is deformed by deformation processing.

FIG. 6 is a diagram showing an example of a character object, a part of which is deformed by the deformation processing. The figure shows character object CH1, which is a character object prior to deformation, and character object CH2, which is a deformed character object. Both the character objects wear short-sleeve clothes object CL. By the deformation shown, the waist of character object CH2 is made narrower than that of character object CH1.

It is of note that the deformation processing is executed for each of clothes objects worn by a character object.

Now, a program and data used for executing the game will be described.

Figure 7:
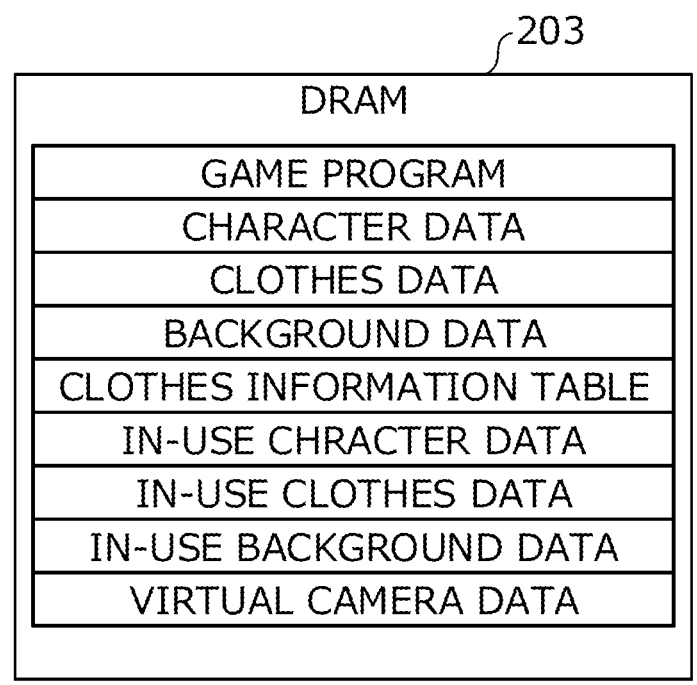
FIG. 7 is a diagram showing an example of a memory map of DRAM 203.

FIG. 7 is a diagram showing an example of a memory map of DRAM 203. As shown in the figure, DRAM 203 stores a game program, character data, clothes data, background data, clothes information table, in-use character data, in-use clothes data, in-use background data, and virtual camera data.

The game program is a program for enabling a user to play the game. The game program is loaded into DRAM 203 from flash memory 202 or an external storage medium. This game program can be distributed via a network such as the Internet or a non-transitory storage medium.

Character data is data representing a character object that appears in the game. Character data is prepared for each of character objects. Character data includes polygon model data, skeleton model data, and a character ID.

Polygon model data is data representing a polygon model of a character object. FIG. 8 is a diagram showing an example of polygon model data. As shown in the figure, polygon model data includes plural items of vertex data, each of which includes coordinate information, normal vector information, color information, UV coordinate information, and joint information. Of those items of information, coordinate information, color information, and joint information will now be described.

Coordinate information is information on a vertex coordinate represented by a local coordinate system.

Color information is information on a parameter set used in deformation processing to which a character object is subjected. As used herein, deformation processing refers to processing for preventing a clothes object worn by a character object from merging into the character object. This deformation processing will be described in detail later.

In a typical graphic system, color information is data used to set a color for a vertex; however, in the present embodiment, the color information is used to set parameters for deformation processing, and is not used to set a color of a character object. By applying vertex setting color information to deformation processing, deformation can be performed for a vertex by use of a conventional data structure. In addition, when a development tool is used, by coloring vertexes (in other words, parts to be deformed) on the basis of the color information that is set for deformation processing, those parts to be deformed are made visible. It is of note that the color information may include an increased number of channels if the color information is used not only for deformation processing but also for setting a color of a vertex.

The color information is expressed in a RGBA format. Each of colors RGBA is represented by a value in a range from zero to one. Also, each of the colors RGBA is associated with a part of a character object. Color R is associated with a waist circumference, color G is associated with a shoulder circumference, color B is associated with an elbow circumference, and color A is associated with a circumference of a base of a leg. A number of channels of color information may be increased in proportion to a number of parts to be deformed.

Of those parts, when the waist circumference is to be deformed, R values of vertexes for the waist circumference are set to a value other than zero. When the shoulder circumference is to be deformed, G values of vertexes for the shoulder circumference are set to a value other than zero. When the elbow circumference is to be deformed, B values of vertexes for the elbow circumference are set to a value other than zero. When the circumference of the base of a leg is to be deformed, A values of vertexes for the circumference of the base of a leg are set to a value other than zero. The set value represents a degree of deformation.

Joint information includes joint number information and weight value information. The joint number information indicates a joint number that affects a vertex represented by the joint information in the event of a change in posture of a skeleton model. The weight value information indicates how a vertex represented by the joint information is affected in the event of a change in posture of the skeleton model.

Skeleton model data represents a skeleton model of a character object. FIG. 9 is a diagram showing an example of skeleton model data. As shown in the figure, the skeleton model data includes plural items of joint data, each of which includes coordinate information and link information. The coordinate information indicates a coordinate of a joint represented by a local coordinate system. Link information indicates a number of an upper joint connected to a joint represented by joint data.

The character data described in the foregoing is loaded into DRAM 203 from flash memory 202 or an external storage medium.

Clothes data represents clothes object worn by a character object. The clothes data is prepared for each of clothes objects. The each of the clothes objects is prepared for the each of the character objects.

The clothes data includes polygon model data and a clothes ID. The polygon model data represents a polygon model of a clothes object. FIG. 10 is a diagram showing an example of polygon model data. As shown in the figure, the polygon model data includes plural items of vertex data, each of which includes coordinate information, normal vector information, color information, UV coordinate information, and joint information. Of those items of information, coordinate information, color information, and joint information will be described.

The coordinate information is information on a vertex coordinate represented by a local coordinate system.

The color information indicates a color assigned to a vertex.

The joint information includes joint number information and weight value information. The joint number indicates a joint number that affects a vertex represented by joint information in the event of a change in posture of a skeleton model. The weight value information indicates how a vertex represented by the joint information is affected in the event of a change in posture of a skeleton model. As used herein, skeleton model refers to a skeleton mode of a character object that wears a clothes object represented by joint information.

The clothes data is loaded into DRAM 203 from flash memory 202 or an external storage medium.

Background data represents a background object such as a ground object, a river object, or a house object. The background data is prepared for each background object.

The background data includes polygon model data and a background ID. The polygon model data represents a polygon model of a background object. FIG. 11 is a diagram showing an example of polygon model data. As shown in the figure, the polygon model data includes plural items of vertex data, each of which includes coordinate information, normal vector information, color information, and UV coordinate information. Of those items of information, the coordinate information and the color information will be described.

The coordinate information is information on a vertex coordinate represented by a local coordinate system.

The color information indicates a color assigned to a vertex.

The background data is loaded into DRAM 203 from flash memory 202 or an external storage medium.

Figures 12, 13:
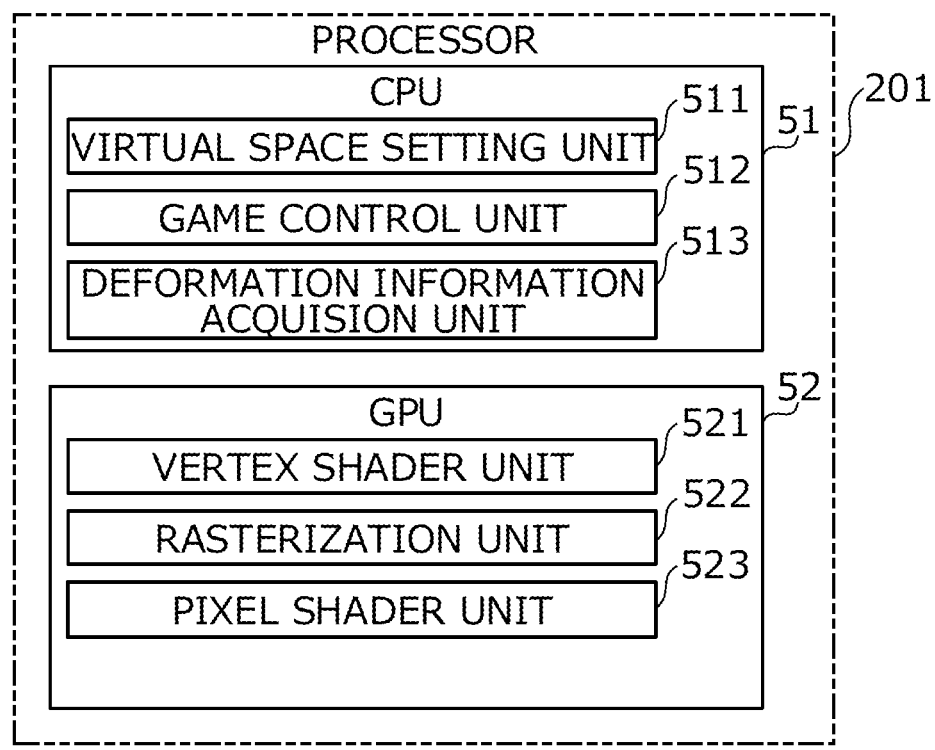
FIG. 12 is a diagram showing an example of a clothes information table.
FIG. 13 is a diagram showing an example of functions provided by a game program.

The clothes information table is a table for storing a parameter set (hereafter, referred to as "clothes information") used in deformation processing. FIG. 12 is a diagram showing an example of the clothes information table. As shown in the figure, the clothes information table stores a set of RGBA values and a maximum reduction amount as the clothes information.

Of those items of information, each of RGBA values is represented by a value in a range from zero to one. Also, each of the RGBA values is associated with a waist circumference, a shoulder circumference, an elbow circumference, or a circumference of a base of a leg, as in the case of color information of a character data. Of those parts, when the waist circumference is to be deformed, an R value is set to a value other than zero. When the shoulder circumference is to be deformed, a G value is set to a value other than zero. When the elbow circumference is to be deformed, a B value is set to a value other than zero. When the circumference of the base of a leg is to be deformed, an A value is set to a value other than zero. The set value represents a degree of deformation. On the other hand, a maximum reduction amount is represented by a value in a range from zero to one, which represents a degree of deformation.

In the shown clothes information table, clothes information is set for each type ID of a clothes object. The clothes types include sleeveless, short-sleeve, long-sleeve, and bottoms. Also, clothes information is set for each of character IDs of a character object.

In-use character data represents a character object disposed within the virtual space. The in-use character data represents a character object that is represented by character data, and is selected in accordance with a player's operation. The in-use character data is stored per character object. The in-use character data includes polygon model data, skeleton model data, and a character ID, as in the case of character data. Of those items of data, polygon model data and skeleton model data include coordinate information that is represented by the world coordinate system.

The in-use character data is updated in frame (for example, every one sixtieth of a second) by game control unit 512 (described later) in accordance with a player's operation.

The in-use clothes data represents clothes object worn by a character object disposed within the virtual space. The in-use clothes data represents clothes object that is represented by clothes data, and is selected in accordance with a player's operation. The in-use clothes data is stored on per clothes object. The in-use clothes data includes polygon model data and a clothes ID, as in the case of the clothes data. Of those items of data, the polygon model data includes coordinate information that is represented by the world coordinate system.

The in-use clothes data is updated in frame by game control unit 512 in accordance with a player's operation.

In-use background data represents a background object disposed within the virtual space. The in-use background data represents a background object represented by background data, and is selected in accordance with a player's operation. The in-use background data is stored per background object. The in-use background data includes polygon model data and a background ID, as in the case of the background data. Of those items of data, polygon model data includes coordinate information that is represented by the world coordinate system.

The in-use background data is updated in frame by game control unit 512 in accordance with a player's operation.

Virtual camera data indicates a position, a shooting direction, and a zoom setting. The virtual camera data is updated in frame by game control unit 512 in accordance with a player's operation.

The foregoing is a description of the memory map of DRAM 203.

The game program is loaded into DRAM 203 and executed by processor 201. Upon execution, functions shown in FIG. 13 are provided. Of the functions shown, virtual space setting unit 511, game control unit 512, and deformation information acquisition unit 513 are provided by CPU 51, and vertex shader unit 521, rasterization unit 522, and pixel shader unit 523 are provided by GPU 52. Each of the functions will be described below.

Virtual space setting unit 511 sets the virtual space in accordance with a player's operation at a start of the game. Specifically, virtual space setting unit 511 disposes character objects, clothes objects, background objects, and a virtual camera within the virtual space. Upon doing so, virtual space setting unit 511 disposes each of clothes objects worn by one of the character objects. Data on the disposed objects are stored in DRAM 203 as in-use character data, in-use clothes data, in-use background data, and virtual camera data.

During execution of the game, game control unit 512 updates the in-use character data, the in-use clothes data, the in-use background data, and the virtual camera data in frame in accordance with a player's operation. Specifically, game control unit 512 changes positions, postures, and colors of character objects, clothes objects, background objects, and a virtual camera disposed within the virtual space.

Deformation information acquisition unit 513 acquires information to be used in deformation processing that is performed on a character object disposed within the virtual space. Specifically, deformation information acquisition unit 513 acquires in-use character data (especially, polygon model data) of a character object and clothes information on a clothes object worn by the character object.

From the items of information, deformation information acquisition unit 513 acquires the in-use character data from DRAM 203 to be passed to GPU 52.

As for the clothes information, deformation information acquisition unit 513 initially refers to the in-use clothes data stored in DRAM 203 to identify a clothes ID of the clothes object worn by the character object. Upon identifying the clothes ID, deformation information acquisition unit 513 refers to a conversion table (not shown) to identify a type ID corresponding to the identified clothes ID. Upon identifying the type ID, deformation information acquisition unit 513 refers to the clothes information table to acquire clothes information associated with the identified type ID and a character ID of the character object. Upon acquiring the clothes information, deformation information acquisition unit 513 passes the clothes information to GPU 52.

Vertex shader unit 521 performs coordinate transformation for an object. Specifically, vertex shader unit 521 performs model transformation processing, deformation processing, and view transformation processing.

In this processing, the model transformation processing is processing for transforming a coordinate of an object disposed within the virtual space from a local coordinate system to the world coordinate system.

The deformation processing is processing for deforming a part of a character object disposed within the virtual space. The deformation processing is performed to prevent a clothes object from merging into a character object, as described above.

To perform the deformation processing, vertex shader unit 521 acquires from deformation information acquisition unit 513 in-use character data of a character object that is a subject of the deformation processing. Vertex shader unit 521 also acquires from deformation information acquisition unit 513 clothes information for a clothes object worn by the character object. Thereafter, vertex shader unit 521 performs coordinate transformation processing on each item of vertex data included in acquired polygon model data, on the basis of the acquired clothes information.

When performing the coordinate transformation processing, vertex shader unit 521 identifies color information for vertex data to be processed. Upon identifying the color information, vertex shader unit 521 calculates a displacement amount for the vertex coordinate on the basis of the identified color information and the acquired clothes information. Specifically, vertex shader unit 521 initially multiplies values corresponding to a same color between RGBA values of the color information and RGBA values of the clothes information. For example, in a case where the RGBA values of the color information are (1,0,0,0), and the RGBA values of the clothes information are (1,0,0,0), vertex shader unit 521 calculates a value "1" as a product for the R value, and calculates a value "0" as products for the G value, the B value, and the A value. In another example, in a case that the RGBA values of the color information are (1,0,0,0), and the RGBA values of the clothes information are (0,0,0,1), vertex shader unit 521 calculates a value "0" as products for all of the RGBA values. In the calculation of a product, only in a case where neither of values corresponding to a same color is zero between the color information and the clothes information, vertex shader unit 521 calculates a non-zero product. Accordingly, only for vertex data that corresponds to a part designated to be deformed in the clothes information, vertex shader unit 521 calculates a non-zero product.

After calculating a product for each color, vertex shader unit 521 multiplies a calculated non-zero product by a maximum reduction amount included in the color information to calculate a displacement amount. For example, in a case that a calculated non-zero product is "1," and a maximum reduction amount is "0.35," vertex shader unit 521 calculates a displacement amount "0.35."

Upon calculating the displacement amount, vertex shader unit 521 identifies normal vector information for the vertex data to be processed. Upon identifying the normal vector information, vertex shader unit 521 calculates a coordinate of a displaced vertex on the basis of the identified normal vector information and the calculated displacement amount. Specifically, vertex shader unit 521 displaces an original vertex coordinate by the displacement amount in a negative normal direction. The vertex coordinate thus calculated is a coordinate indicative of a retracted position relative to the original vertex coordinate.

Upon calculating the vertex coordinate, vertex shader unit 521 replaces the original vertex coordinate with the calculated vertex coordinate to displace the vertex to be processed.

Vertex shader unit 521 performs coordinate transformation processing as described in the foregoing for each item of vertex data included in the polygon model data to deform a part of the character object such that the clothes object does not merge into the character object.

The view transformation processing is processing to transform a coordinate of an object disposed within the virtual space from the world coordinate system to the camera coordinate system. Upon performing the view transformation processing, vertex shader unit 521 transforms a coordinate of an object disposed within the virtual space from the world coordinate system to the camera coordinate system on the basis of character data whose coordinate has been transformed by deformation processing, and of in-use clothes data, in-use background data, and virtual camera data stored in DRAM 203.

The foregoing is a description of vertex shader unit 521.

Rasterization unit 522 generates pixel data that represents the virtual space on the basis of character data, in-use clothes data, and in-use background data, coordinates of which have been transformed by view transformation processing.

Pixel shader unit 523 draws an image representing the virtual space in a frame buffer on the basis of pixel data generated by rasterization unit 522.

1-2. Operation

An operation of game system 1 will be described. In particular, rendering processing executed during game play will be described.

Figure 14:
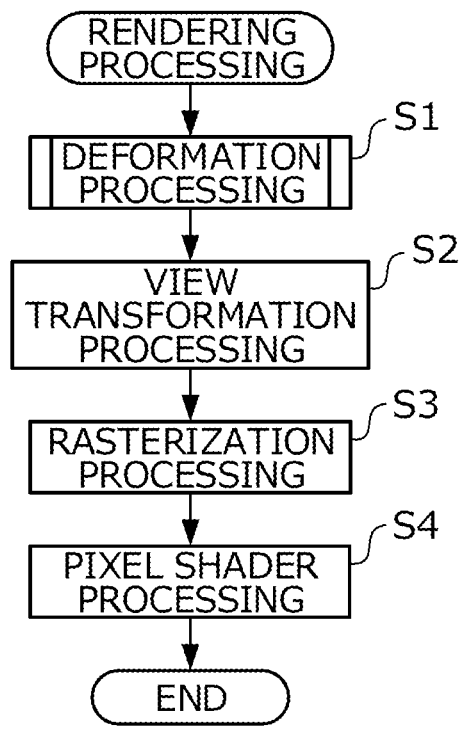
FIG. 14 is a flowchart showing an example of rendering processing.

FIG. 14 is a flowchart showing an example of the rendering processing. The rendering processing shown is executed in frame.

At step S1 of the rendering processing, vertex shader unit 521 executes transformation processing for each character object disposed within the virtual space.

Figure 15:
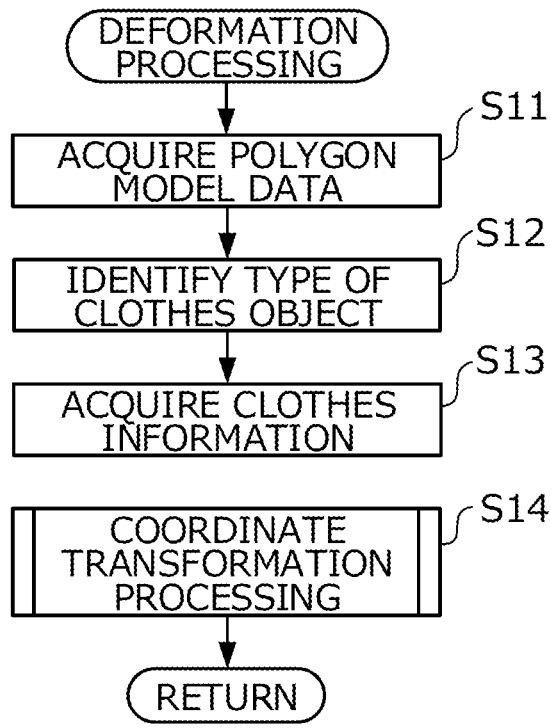
FIG. 15 is a flowchart showing an example of deformation processing.

FIG. 15 is a flowchart showing an example of deformation processing.

At step S11 of the deformation processing, deformation information acquisition unit 513 acquires from DRAM 203 in-use character data (especially, polygon model data) of a character object to be processed. Upon acquiring the in-use character data, deformation information acquisition unit 513 identifies a clothes ID of a clothes object worn by the character object, by referring to in-use clothes data stored in DRAM 203. Subsequently, deformation information acquisition unit 513 identifies a type ID corresponding to the identified clothes ID, by referring to a conversion table (not shown) (step S12). Upon identifying the type ID, deformation information acquisition unit 513 acquires clothes information associated with a character ID of the character object and the identified type ID, by referring to the clothes information table (step S13).

After the clothes information is acquired, vertex shader unit 521 performs coordinate transformation processing on each item of vertex data included in acquired polygon model data, on the basis of the clothes information (step S14).

Figure 16:
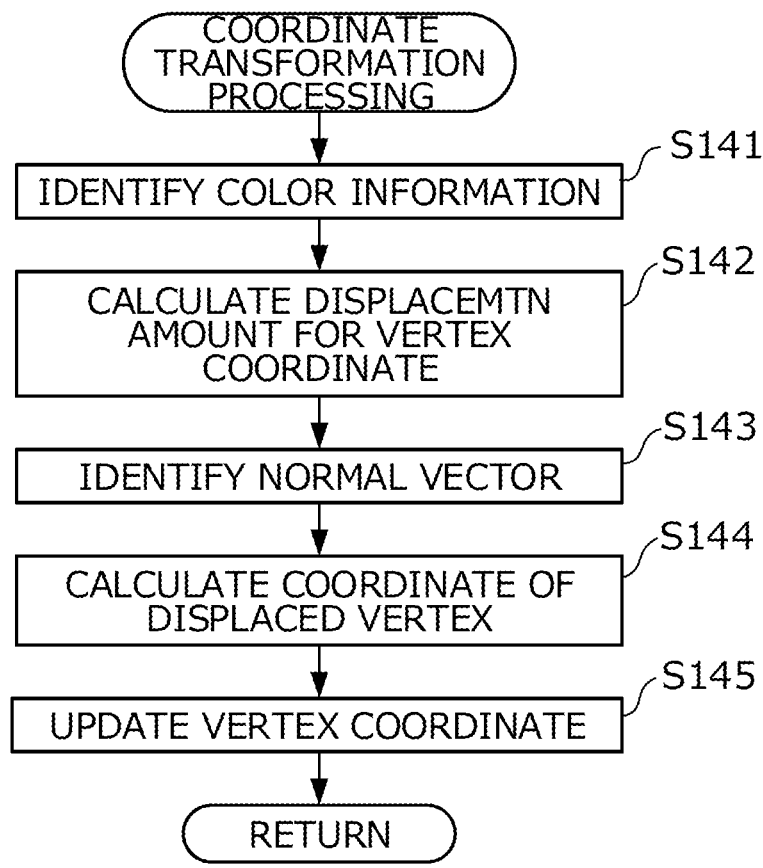
FIG. 16 is a flowchart showing an example of coordinate transformation processing.

FIG. 16 is a flowchart showing an example of the coordinate transformation processing.

At step S141 of the coordinate transformation processing, vertex shader unit 521 identifies color information for vertex data to be processed. Upon identifying the color information, vertex shader unit 521 calculates a displacement amount for the vertex coordinate on the basis of the color information and the clothes information (step S142). Specifically, vertex shader unit 521 initially multiplies values corresponding to a same color between RGBA values of the color information and RGBA values of the clothes information. After calculating a product for each color, vertex shader unit 521 multiplies a calculated non-zero product by a maximum reduction amount included in the color information to calculate a displacement amount. Upon calculating the displacement amount, vertex shader unit 521 identifies normal vector information for the vertex data to be processed (step S143). Upon identifying the normal vector information, vertex shader unit 521 calculates a coordinate of a displaced vertex on the basis of the normal vector information and the displacement amount (step S144). Specifically, vertex shader unit 521 displaces an original vertex coordinate by the displacement amount in a negative normal direction. Upon calculating the vertex coordinate, vertex shader unit 521 replaces the original vertex coordinate with the calculated vertex coordinate (step S145).

Vertex shader unit 521 performs coordinate transformation processing as described in the foregoing for each item of vertex data included in the polygon model data to deform a part of the character object such that the clothes object does not merge into the character object.

After deformation processing is performed for all character objects disposed within the virtual space, vertex shader unit 521 transforms coordinates of the objects disposed within the virtual space from the world coordinate system to the camera coordinate system on the basis of character data whose coordinates have been transformed by deformation processing, and of in-use clothes data, in-use background data, and virtual camera data stored in DRAM 203 (step S2).

After the view transformation processing is performed, rasterization unit 522 generates pixel data that represents the virtual space on the basis of character data, in-use clothes data, and in-use background data, coordinates of which have been transformed by the view transformation processing (step S3).

After the rasterization processing is performed, pixel shader unit 523 draws an image that represents the virtual space in a frame buffer on the basis of pixel data generated by rasterization unit 522 (step S4). The image drawn in the frame buffer is displayed on display 211.

The foregoing is a description of the rendering processing.

In the rendering processing described in the foregoing, by appropriately setting color information and clothes information for character data, an in-use item object is prevented from merging into a character object. To prevent such merging, there is no need to create a character object for each type of an in-use item object.

In the above rendering processing, vertex shader processing is executed by GPU 52; accordingly, the vertex shader processing is accelerated, compared to a case where the same processing is executed by CPU 51.

In the above rendering processing, deformation processing is performed using RGBA values (color information); accordingly, deformation processing can be performed using a conventional image-processing technique.

2. Modifications

The above embodiment may be modified as described below. Two or more of the following modifications may be combined with each other.

2-1. Modification 1

In the above embodiment, a clothes object is worn by a character object as a worn-item object; however, another type of a worn-item object may be worn by a character object. For example, a worn-item object such as a hat, shoes, gloves, armor, or a weapon may be worn by a character object.

2-2. Modification 2

In the above embodiment, a part of a character object such as a waist circumference, a shoulder circumference, an elbow circumference, or a circumference of a base of a leg is modified; however, another part of a character object may be modified. For example, a part such as a neck circumference, a wrist circumference, or a circumference of a base of a finger may be modified.

2-3. Modification 3

In the above clothes information table, clothes information is set for each type of clothes object. Specifically, clothing information is set for each of, sleeveless, short-sleeve, long-sleeve, and bottoms. However, clothes classification may either be made more detailed, or may be simplified. For example, clothes information may be set for each of clothes objects.

In the above embodiment, clothes information is set for each of character objects; however, classification of types of a character object may be simplified. Specifically, clothes information is set for each of groups of character objects that has a similar shape.

2-4. Modification 4

In the above deformation processing, a displacement amount for a vertex coordinate is calculated by multiplying values corresponding to a same color between color information and clothes information, and by multiplying a calculated product by a maximum reduction amount. In the calculation process, the multiplication of a calculated product by a maximum reduction amount may be omitted.

2-5. Modification 5

In the above deformation processing, a displacement amount for a vertex coordinate is calculated by multiplying values corresponding to a same color between color information and clothes information, and by multiplying a calculated product by a maximum reduction amount. Instead, a displacement amount for a vertex coordinate may be calculated by adding up values corresponding to a same color, and by adding a maximum reduction amount to a calculated total, or by multiplying the calculated total by the maximum reduction amount.

2-6. Modification 6

In the above deformation processing, after a displacement amount for a vertex coordinate is calculated, the vertex coordinate is displaced in a negative normal direction. In another embodiment, the vertex coordinate may be displaced in a positive normal direction. In other words, the vertex may be moved outwardly from the original position. In that case, an original character object is preset to have a thin form, and clothes information is preset by taking into account by how much a clothes object can be deformed in a normal direction. It is of note that in which of a positive normal direction and a negative normal direction a vertex should be displaced may be set for each of colors in clothes information.

2-7. Modification 7

In the above embodiment, color information and clothes information are represented in a RGBA format. However, they do not necessarily have to be represented in the RGBA format, and may be represented in another format.

2-8. Modification 8

In the above embodiment, vertex shader processing is executed by GPU 52; however, the processing need not necessarily be executed by GPU 52, and may be executed by CPU 51.

2-9. Modification 9

Game system 1 is an example of an information-processing device on which the game program can be executed. The game program may be executed on another information-processing device such as a smartphone or a PC. The functions provided by the game program may be distributed among networked information-processing devices.

What is claimed is:

1. An information-processing device comprising:
    at least one processor including a GPU having a vertex shader function; and
    at least one storage medium, wherein:
    the at least one storage medium is configured to store at least:
        data on a character object;
        data on worn-item objects to be worn by the character object; and
        first parameters, each of which is associated with at least a part of the character object and with a type of one of the worn-item objects, and
    the at least one processor is configured to:
        select within a virtual space one of the worn-item objects, to be worn by the character object;
        control the character object within the virtual space;
        deform a part of the character object by a degree according to one of the first parameters associated with the selected one of the worn-item objects, the part of the character object being associated with the one of the first parameters; and
        generate, by use of a virtual camera, an image of the virtual space that includes the character object wearing the selected one of the worn-item objects, wherein:
    the at least one processor is configured to deform the part of the character object by displacing a vertex included in the part of the character object by the degree according to the one of the first parameters; and
    the at least one processor is configured to displace the vertex in a positive or negative normal direction.

2. The information-processing device according to claim 1, wherein:
    the at least one storage medium is configured to store second parameters, each of which is associated with at least a part of the character object and with one of vertexes of the character object; and
    the at least one processor is configured to displace the vertex by the degree according to the one of the first parameters and to one of the second parameters associated with the vertex.

3. An information-processing device comprising:
    at least one processor including a GPU having a vertex shader function; and
    at least one storage medium, wherein:
    the at least one storage medium is configured to store at least:
        data on a character object;
        data on worn-item objects to be worn by the character object; and
        first parameters, each of which is associated with at least a part of the character object and with a type of one of the worn-item objects, and
    the at least one processor is configured to:
        select within a virtual space one of the worn-item objects, to be worn by the character object;
        control the character object within the virtual space;
        deform a part of the character object by a degree according to one of the first parameters associated with the selected one of the worn-item objects, the part of the character object being associated with the one of the first parameters; and
        generate, by use of a virtual camera, an image of the virtual space that includes the character object wearing the selected one of the worn-item objects, wherein:
    the at least one processor is configured to deform the part of the character object by displacing a vertex included in the part of the character object by the degree according to the one of the first parameters;
    the at least one storage medium is configured to store second parameters, each of which is associated with at least a part of the character object and with one of vertexes of the character object;
    the at least one processor is configured to displace the vertex by the degree according to the one of the first parameters and to one of the second parameters associated with the vertex;
    each of plural parts of the character object is associated with a color;
    the at least one storage medium is configured to store each of the second parameters as at least one channel of vertex color information for the character object;
    the at least one storage medium is configured to store each of the first parameters as a value corresponding to a color of one of the second parameters which are stored as vertex color information; and
    the at least one processor is configured, instead of using the one of the second parameters to determine a color of the character object, to displace the vertex for which a vertex color is set as part data by the degree according to the one of the second parameters associated with the vertex and to the one of the first parameters that corresponds to the vertex color, to deform the part of the character object that corresponds to the vertex color.

4. The information-processing device according to claim 1, wherein:
    the at least one storage medium is configured to store data on character objects including the character object;
    the at least one storage medium is configured to store the first parameters, each of which is associated with a type of one of the character objects and with a type of one of the worn-item objects; the at least one processor is configured to determine the degree of deformation on the basis of at least the one of the first parameters associated with the character object and the selected one of the worn-item objects; and
    the at least one processor is configured to generate, by use of the virtual camera, an image of the virtual space that includes the character objects that wear one of the worn-item objects.

5. The information-processing device according to claim 1, wherein the worn-item objects are clothes objects to be worn by the character object.

6. A non-transitory computer readable storage medium having stored therein an information processing program executable by one or more computer processors of an information-processing device, wherein the one or more computer processors includes a GPU having a vertex shader function, and wherein the information processing program, when executed, causes the one or more computer processors to perform functionality comprising:

within a virtual space, selecting a worn-item object worn by a character object;
controlling the character object within the virtual space;
deforming at least a part of the character object by a degree according to a first parameter that is associated with the at least a part of the character object and with a type of the worn-item object; and
generating, by use of a virtual camera, an image of the virtual space that includes the character object wearing the worn-item object; wherein:
the part of the character object is deformed by displacing a vertex included in the part of the character object by the degree according to the one of the first parameters; and
the vertex is displaced in a positive or negative normal direction.

7. The non-transitory storage medium according to claim 6, wherein the vertex is displaced by the degree according to the first parameter and a second parameter associated with the vertex and at least a part of the character object.

8. A non-transitory computer readable storage medium having stored therein an information processing program executable by one or more computer processors of an information-processing device, wherein the one or more computer processors includes a GPU having a vertex shader function, and wherein the information processing program, when executed, causes the one or more computer processors to perform functionality comprising:

within a virtual space, selecting a worn-item object worn by a character object;
controlling the character object within the virtual space;
deforming at least a part of the character object by a degree according to a first parameter that is associated with the at least a part of the character object and with a type of the worn-item object; and
generating, by use of a virtual camera, an image of the virtual space that includes the character object wearing the worn-item object; wherein:
the part of the character object is deformed by displacing a vertex included in the part of the character object by the degree according to the one of the first parameters;
second parameters are stored, each of which is associated with at least a part of the character object and with one of vertexes of the character object;
the vertex is displaced by the degree according to the one of the first parameters and to one of the second parameters associated with the vertex;
each of plural parts of the character object is associated with a color;
the second parameter is set as at least one channel of vertex color information for the character object;
the first parameter is set as a value corresponding to a color of the second parameter which is stored as vertex color information; and
instead of using the second parameter to determine a color of the character object, the vertex for which a vertex color is set as part data is displaced by the degree according to the second parameter associated with the vertex and to the first parameter corresponding to the vertex color, thereby deforming the at least a part of the character object that corresponds to the vertex color.

9. The non-transitory storage medium according to claim 6, wherein:
the first parameter is associated with a type of one of character objects and with a type of one of worn-item objects;
the degree of deformation is determined on the basis of at least the first parameter associated with the character object and the worn-item object; and
an image of the virtual space that includes the character objects that wear one of the worn-item objects is generated by use of the virtual camera.

10. The non-transitory storage medium according to claim 6, wherein the worn-item object is a clothes object to be worn by the character object.

11. An information-processing system comprising:
at least one processor including a GPU having a vertex shader function; and
at least one storage medium, wherein:
the at least one storage medium is configured to store at least:
data on a character object;
data on worn-item objects to be worn by the character object; and
first parameters, each of which is associated with at least a part of the character object and with a type of one of the worn-item objects, and
the at least one processor is configured to:
within a virtual space, select one of the worn-item objects, to be worn by the character object;
control the character object within the virtual space;
deform a part of the character object by a degree according to one of the first parameters associated with the selected one of the worn-item objects, the part of the character object being associated with the one of the first parameters; and
generate, by use of a virtual camera, an image of the virtual space that includes the character object wearing the selected one of the worn-item objects, wherein:
the at least one processor is configured to deform the part of the character object by displacing a vertex included in the part of the character object by the degree according to the one of the first parameters; and
wherein the at least one processor is configured to displace the vertex in a positive or negative normal direction.

12. An information-processing method comprising:
causing at least one storage medium to store at least:
data on a character object;
data on worn-item objects to be worn by the character object; and
first parameters, each of which is associated with at least one part of the character object and with a type of one of the worn-item objects, and
causing at least one processor to:
within a virtual space, select one of the worn-item objects, to be worn by the character object;
control the character object within the virtual space;
deform a part of the character object by a degree according to one of the first parameters associated with the selected one of the worn-item objects, the part of the character object being associated with the one of the first parameters; and
generate, by use of a virtual camera, an image of the virtual space that includes the character object wearing the selected one of the worn-item objects, wherein:

the at least one processor includes a GPU having a vertex shader function;
the at least one processor is caused to deform the part of the character object by displacing a vertex included in the part of the character object by the degree according to the one of the first parameters; and
the at least one processor is caused to displace the vertex in a positive or negative normal direction.

13. The information-processing method according to claim 12, wherein:
the at least one storage medium is further caused to store second parameters, each of which is associated with at least one part of the character object and with one of vertexes of the character object; and
the at least one processor is caused to displace the vertex by the degree according to the one of the first parameters and to one of the second parameters associated with the vertex.

14. An information-processing method comprising:
causing at least one storage medium to store at least:
data on a character object;
data on worn-item objects to be worn by the character object; and
first parameters, each of which is associated with at least one part of the character object and with a type of one of the worn-item objects, and
causing at least one processor to:
within a virtual space, select one of the worn-item objects, to be worn by the character object;
control the character object within the virtual space;
deform a part of the character object by a degree according to one of the first parameters associated with the selected one of the worn-item objects, the part of the character object being associated with the one of the first parameters; and
generate, by use of a virtual camera, an image of the virtual space that includes the character object wearing the selected one of the worn-item objects, wherein:
the at least one processor includes a GPU having a vertex shader function;
the at least one processor is caused to deform the part of the character object by displacing a vertex included in the part of the character object by the degree according to the one of the first parameters;
the at least one storage medium is configured to store second parameters, each of which is associated with at least a part of the character object and with one of vertexes of the character object;
the at least one processor is configured to displace the vertex by the degree according to the one of the first parameters and to one of the second parameters associated with the vertex;
each of plural parts of the character object is associated with a color;
the at least one storage medium is caused to store each of the second parameters as at least one channel of vertex color information for the character object;
the at least one storage medium is caused to store each of the first parameters as a value corresponding to a color of one of the second parameters which are stored as vertex color information; and
the at least one processor is caused, instead of using the one of the second parameters to determine a color of the character object, to displace the vertex for which a vertex color is set as part data by the degree according to the one of the second parameters associated with the vertex and to the one of the first parameters that corresponds to the vertex color, thereby deforming the part of the character object that corresponds to the vertex color.

15. The information-processing device according to claim 12, wherein:
the at least one storage medium is configured to store data on character objects including the character object;
the at least one storage medium is configured to store the first parameters, each of which is associated with a type of one of the character objects and with a type of one of the worn-item objects; the at least one processor is configured to determine the degree of deformation on the basis of at least the one of the first parameters associated with the character object and the selected one of the worn-item objects; and
the at least one processor is configured to generate, by use of the virtual camera, an image of the virtual space that includes the character objects that wear one of the worn-item objects.

16. The information-processing device according to claim 12, wherein the worn-item objects are clothes objects to be worn by the character object.

17. An information-processing system comprising:
at least one processor including a GPU having a vertex shader function; and
at least one storage medium, wherein:
the at least one storage medium is configured to store at least:
data on a character object;
data on worn-item objects to be worn by the character object; and
first parameters, each of which is associated with at least a part of the character object and with a type of one of the worn-item objects, and
the at least one processor is configured to:
within a virtual space, select one of the worn-item objects, to be worn by the character object;
control the character object within the virtual space;
deform a part of the character object by a degree according to one of the first parameters associated with the selected one of the worn-item objects, the part of the character object being associated with the one of the first parameters; and
generate, by use of a virtual camera, an image of the virtual space that includes the character object wearing the selected one of the worn-item objects, wherein:
the at least one processor is configured to deform the part of the character object by displacing a vertex included in the part of the character object by the degree according to the one of the first parameters;
the at least one storage medium is configured to store second parameters, each of which is associated with at least a part of the character object and with one of vertexes of the character object;
the at least one processor is configured to displace the vertex by the degree according to the one of the first parameters and to one of the second parameters associated with the vertex;
each of plural parts of the character object is associated with a color;
the at least one storage medium is configured to store each of the second parameters as at least one channel of vertex color information for the character object;
the at least one storage medium is configured to store each of the first parameters as a value corresponding to a color of one of the second parameters which are stored as vertex color information; and the at least one processor is configured, instead of using the one of the second parameters to determine a color of the character object, to displace the vertex for which a vertex color is set as part data by the degree according to the one of the second parameters associated with the vertex and to the one of the first parameters that corresponds to the vertex color, to deform the part of the character object that corresponds to the vertex color.

* * * * *